United States Patent [19]

Alber

[11] Patent Number: 4,655,609

[45] Date of Patent: Apr. 7, 1987

[54] METHOD FOR THE MANUFACTURE OF A THERMOMETER AND THERMOMETER

[76] Inventor: Bernd Alber, Ritter Str. 19, D-7500 Karlsruhe 1, Fed. Rep. of Germany

[21] Appl. No.: 823,675

[22] Filed: Jan. 29, 1986

Related U.S. Application Data

[62] Division of Ser. No. 708,243, Mar. 5, 1985, abandoned.

[30] Foreign Application Priority Data

Mar. 10, 1984 [DE] Fed. Rep. of Germany ....... 3408799
May 23, 1984 [DE] Fed. Rep. of Germany ....... 3419155

[51] Int. Cl.⁴ .............................................. G01K 1/16
[52] U.S. Cl. ......................................... 374/194; 65/62; 65/68; 65/109; 65/110; 206/306; 374/190
[58] Field of Search ..................... 65/62, 68, 109, 110; 374/201, 200, 190, 194; 206/306

[56] References Cited

U.S. PATENT DOCUMENTS 801,681 10/1905 Nurnberg ............................ 206/306
2,189,123 2/1940 Barker ............................ 374/201 X
2,520,911 9/1950 Chaney ........................... 374/201 X
3,183,721 5/1965 Kaynan ................................ 65/62 X
3,186,814 6/1965 Hobin ..................................... 65/110
3,803,915 4/1974 Chaney ................................ 374/194

FOREIGN PATENT DOCUMENTS 1078551 11/1954 France ................................. 374/194

Primary Examiner—Arthur Kellogg

[57] ABSTRACT

A method for the manufacture of a thermometer provides for a bulb being formed on the thermometer capillary, a bulb receptacle being formed on the lower envelope tube end and at least over part of the receptacle its inner contour exactly corresponds to the outer contour of the bulb. The thermometer capillary is then introduced into the envelope tube and the bulb is accurately fitted into the lower part of the receptacle. In the case of a thermoareometer, the receptacle particularly serves as a weight for receiving the necessary weight-providing material, such as copper or the like.

28 Claims, 5 Drawing Figures

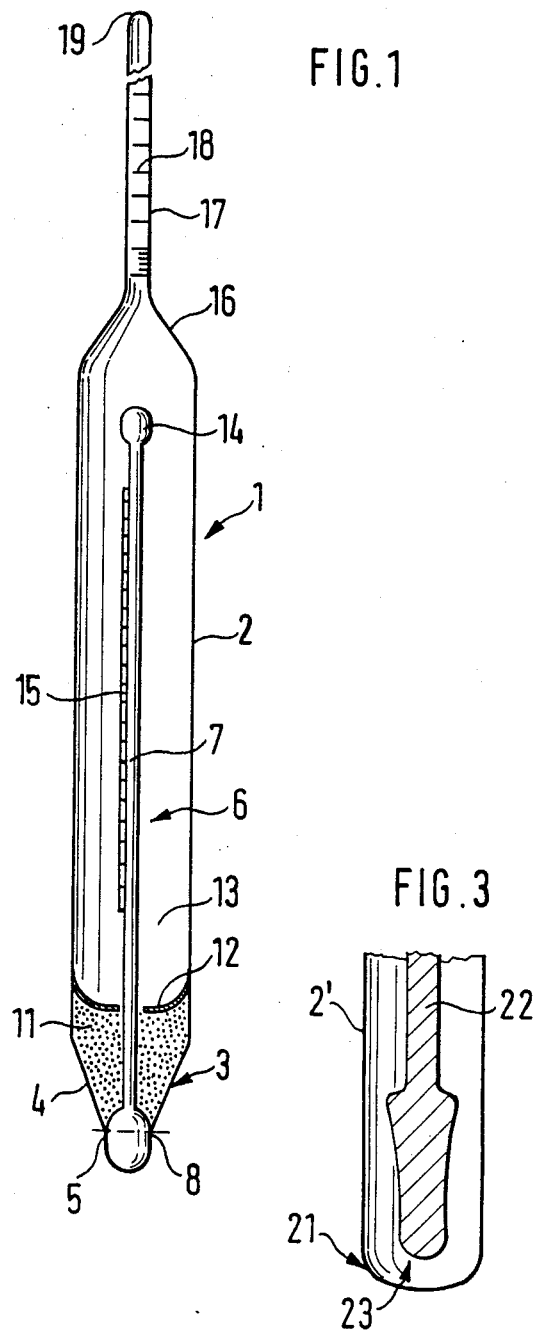
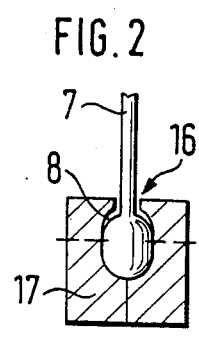
FIG. 1
FIG. 2
FIG. 3

METHOD FOR THE MANUFACTURE OF A THERMOMETER AND THERMOMETER

CROSS REFERENCE TO RELATED APPLICATIONS

This application is a divisional application of Ser. No. 708,243 filed Mar. 5, 1985 by Applicant herein under the following title THERMOMETER AND METHOD FOR THE MANUFACTURE OF A THERMOMETER now abandoned.

BACKGROUND OF THE INVENTION

The present invention relates to a method for the manufacture of a thermometer particularly a thermoareometer especially made of glass.

In the same way as therometer, the thermoareometers have been known for a considerable time and form a subvariety of a graduated hydrometer provided with a thermometer. Thermoareometers are known, in which the thermometer bulb serves as a ballast chamber. In addition, thermoareometers are known, which have so-called double balls and below the bulb there is a second part acting as a weight. Nowadays, the thermoareometers which are produced have the ballast filled in and surrounding the thermometric capillary above the bulb.

The manufacture of a good thermometer of precision thermometer, generally of glass, as well as a thermoareometer fundamentally, substantially takes place in the following manner. Firstly, the envelope tube, or the areometer body (base) in an areometer, is preshaped from a hollow glass part or a tubular glass part and in the vicinity of the lower end a constriction is formed, e.g. by means of a rolling machine or the like. A substantially tubular or hemispherical section is generally connected to this constriction. In addition, a capillary is bent in S-shaped manner and its end is generally expanded in funnel-shaped manner, optionally following the formation of a contraction enlargement, and/or a glass ring is fused onto the end. The diameter of the funnel on the capillary or glass ring substantially corresponds to the diameter of the envelope tube constriction. An expansion enlargement is then normally blown into the end opposite to the funnel. The glass blower then takes up the expanded capillary and/or the capillary provided with the glass ring and feeds it into the envelope tube up to the constriction. Accompanied by heating, the glass blower then fuses the funnel or ring to the aforementioned tubular or spherical part of the thermometer or thermoareometer. The fused in funnel or glass ring forms the upper part of the bulb. The capillary projects into the side of the hollow glass opposite to the upper part of the bulb or tube. This is followed by the turning of the envelope tube and a quantity of thermometric liquid is introduced into the tube which corresponds to the desired elevation or pitch of the capillary used. After marking, the uppermost thermometric liquid level in the tube, the liquid is removed and the end of the tube is precisely sealed at the mark giving the lower part of the now closed bulb. The bulb, together with the capillary, are then generally pumped free from air, filled with thermometric liquid, followed by the preadjusting of the thermometer.

The excess thermometric liquid is removed from the capillary by burning off, i.e. heating the liquid in the upper part of the capillary for evaporating the excess liquid. Each individual thermometer or areometer body with capillary must be manually introduced into a burning off apparatus. As a function of the liquid used, more or less toxic vapous are formed (e.g. very dangerous mercury vapours). To ensure that an excessive amount of thermometric liquid is not burnt off from the capillary, each burning off operation must be carefully observed and the particular thermometer or areometer body must be removed from the burning off apparatus in good time. This complicated preadjustment is brought about in that the previousuly formed expansion enlargements vary more in the inner volume and due to the narrowness of the body, cannot be subsequently formed. The capillary is sealed after marking the preadjustment filling level. The thermometric scale carrier, together with the scale, are then introduced into the envelope tube and connected to the capillary in various different ways. The scale is generally supported on the S-shaped bend in the capillary. The thermometer is then sealed at the top, the scale generally being additionally fixed at the seal. The scale is graduated in accordance with the elevation of the capillary. In the case of a thermoareometer, the upper end of the areometer body is constricted and the stem is fused as cylindrically and vertically as possible. The vertical, central fusion is important, so that subsequently the areometer floats completely vertically to the surface of the liquid to be measured and consequently provides the optimum state for a correct reading of the apparatus (measurement).

Furthermore, particularly in the case of a thermoareometer, the weight is introduced into the areometer body, the areometric scale carrier is introduced into the stem and fixed, the adjustments of the areometric scale are carried out, whilst supplementing the balance during adjustment and sealing by means of sealing wax or the like in the vicinity of the weight. Finally, the top of the stem is generally once again manually sealed. With regards to further details on the manufacture of thermoareometers, reference should be made to the aforementioned publication, which describes the procedure in detail and nothing has fundamentally changed with respect thereto.

The decisive point is that a large part and specifically the most difficult part of the manufacture of precision thermometers and areometers takes place manually. Thus, in particular, the connection of the envelope tube and the thermometer capillary can only be carried out by a highly qualified special glass blower, who has had many years experience and who is therefore very well paid. It takes him several minutes to construct the glass tube, expand the capillary, complete the bulb and form the stem top. Even in the case of a good glass blower, it is still impossible to completely avoid a certain amount of waste. Automatic capillary blowing machines cannot be used in the manufacture of such thermometers.

SUMMARY OF THE INVENTION

The problem of the present invention is to provide a very inexpensively manufactured thermometer, also in the form of a thermoareometer, in which the thermometric liquid responds just as quickly and accurately as in conventionally produced thermometers, whilst also providing a method which permits a substantial automation of the thermometer manufacturing process.

According to the inventive method for the substantially automated manufacture of a thermometer or thermoareometer a thermometer capillary probe vessel or bulb is formed in a mould, a receptacle for the probe vessel is formed at the lower end of the envelope tube by means of a mandrel, whereby at least over part of the receptacle it has an inner contour exactly corresponding to the outer contour of the probe vessel, and subsequently the thermometer capillary is introduced into the envelope tube and the probe vessel is exactly fitted against the wall of the lower part of the receptacle.

It is important that in a large engagement area, the outer contour of the bulb on the thermometer capillary exactly corresponds to the inner contour of the receptacle of the envelope tube, so that the thermometer bulb is sealingly introduced into the areometer receptacle in a large area with substantially no air pockets, so that insulating intermediate air spaces are avoided. Thus, the thermometer liquid responds just as rapidly and accurately as in thermometers, where laborious manual work has resulted in the lower end of the capillary being fused to the lower end of the envelope tube, so that there are substantially no double walls from the outer wall to the interior of the thermometer bulb. Unlike in the case of the manufacture of thermometers and thermoareometers according to the prior art involving laborious manual work, the thermometer according to the invention, although theoretically also manufacturable manually or in a partially mechanised manner, can be manufactured substantially automatically, as a result of the method steps provided by the invention and the avoidence of the necessity of fusing together the thermometer capillary and the envelope tube. In an apparatus for the manufacture of thermometers, particularly as thermoareometers, with processing stations producing local heat, provides for the space in the envelope tube in the immediate vicinity of the bulb to be filled with good thermally conducting material, such as copper or silver particles and the material is then fixed. As a result of the method according to the invention, up to several hundred thermometers or thermoareometers can be produced every hour by a few people, the precision of the moulds to be produced being in the range 1/100 mm. The wall thickness can fundamentally be in the range below 1 mm. However, advantageously the wall thickness of both the receptacle and the bulb is below 0.5 mm and particularly below 0.3 mm. Due to the fact that the per se poor heat conductor glass is made as thin as possible, the rapid heat transfer to the thermometric fluid is assisted. However, as a result of the construction according to the invention, the limited thickness of the bulb on the one hand and the envelope tube on the other does not lead to any weakening effect. Due to the thermometer bulb being sealingly introduced into the envelope tube receptacle, an extremely high degree of stability is achieved. An important advantage of the method according to the invention is that it is possible to completely obviate the step of an additional common heating and fusion of thermometer capillary and envelope tube, which must be fundamentally performed manually.

Appropriately above (and/or also below) and/or partially around the bulb, a thin coating of copper (e.g. finely divided copper strap), or some similar good heat conducting material, e.g. silver is provided. Preference is given to copper for cost reasons and its surface is sealed in by means of sealing wax, silicone rubber, high temperature-resistant ceramic materials, plastics and the like, so that it cannot slip or slide turning or sloping the thermometer. Above the sealing wax or the like, the capillary projects centrally or axially into the side of the envelope tube opposite to the bulb. The copper surround of the bulb considerably improves the response time of the thermometer according to the invention.

The ease with which the straight capillary can be precisely fitted in the axial centre of the areometer and the fixing of the scale carrier to the straight capillary leads to such an areometer floating completely vertically in the test fluid, whilst having no unbalance, which is not the case with the prior art areometers. Thus, the thermoareometers produced according to the invention also improve the indiciation precision.

In the case of a largely automated method according to the invention, one end of the thermometer capillary is inserted in a mould and the bulb is formed accompanied by heating and blowing therein, whilst the envelope tube receptacle is formed in that it is firstly closed at the lower end and then a mandrel is introduced into the closed end, accompanied by heating. The glass thickness of the lower end of the receptacle is precisely determined by the insertion depth of the mandrel and-/or by the additional planned addition of molten glass.

According to a further preferred development of the invention, due to the ease of fitting the bulb in the envelope tube receptacle, the thermometric scale carrier, including the scale, is fixed to the capillary outside the narrow envelope tube, e.g. by using a rapidly setting high temperature-resistant adhesive, it is possible to obtain a very rapid, esthetically pleasing connection of the scale carrier to the capillary, because the adhesive can be precisely and accurately metered onto the subsequently invisible rear of the capillary. Bonding takes place by simply joining the scale carrier and capillary together. Such a procedure is not possible in the narrow envelope tube. As a result of the motion clearance obtained, the scale carrier can also be fixed in many other ways, to the capillary.

Whereas in the case of laboratory thermometers particularly if intended for higher temperatures, the scales are formed in milk glass which is etched in a complicated manner, according to a preferred development the scale carrier is made from high temperature-resistant material, such as in particular high temperature-resistant paper or fiberglass-enveloped plastic, which is able to withstand temperatures of up to 600° C. or higher. Thus, it is easy to print these materials. They can also be bonded in, whereas the milk glass carrier has hitherto been fixed with wire into the envelope tube, the wire fixing points being the most sensitive to breakage and are advantagouesly obviated by the procedure according to the invention.

The possibility of fitting the thermometric scale carrier to the capillary outside the envelope tube leads to the further advantage that there is no need to use capillaries with an S-shaped bend and instead completely straight, automatically manufactured capillaries can be inserted together with the bulbs.

An additional advantage of the invention is the much easier and faster preadjustment of the thermometer, which also leads to no evolution of toxic vapours. The straight capillaries filled with thermometric liquid and open at the top, whilst also being substantially identical with regards to length, elevation or pitch and volume of the expansion vessel, need only be placed in an approximately vertical position in a thermostat, such as a drying oven or liquid bath and heated to a given temperature, which is much lower than that hitherto required for burning off. As a result of expansion, excess thermometric liquid flows out of the openings of all the capillaries, so that the same quantity remains in all the latter.

Outflowing liquid can easily be removed, e.g. by dabbing off. Then, the adjustment fill level is marked. This is followed by the sealing of the capillaries and the formation of the expansion enlargement in one operation, which can easily be carried out outside the narrow envelope tube. The aforementioned procedure permits the simultaneous preadjustment in a very rapid, easy and accurate manner of a large number of capillaries, without any danger to the workers. The hitherto long burning off process is now unnecessary.

Another advantage of the invention is that the areometer stem tops can be automatically formed, no matter what their lengths and diameters.

BRIEF DESCRIPTION OF THE DRAWINGS

Further advantages and features of the invention can be gathered from the claims and description of an embodiment of a thermometer according to the invention, as well as the essential stages of the thermometer manufacturing method according to the invention, with respect to the drawings, where in show:

FIG. 1 a completed thermometer according to the invention, in the form of a thermoareometer.

FIG. 2 the step of manufacturing the capillary part of the thermometer.

FIG. 3 the start of the manufacture of the receptacle for the thermometer bulb.

DETAILED DESCRIPTION OF THE INVENTION

Figure 4:
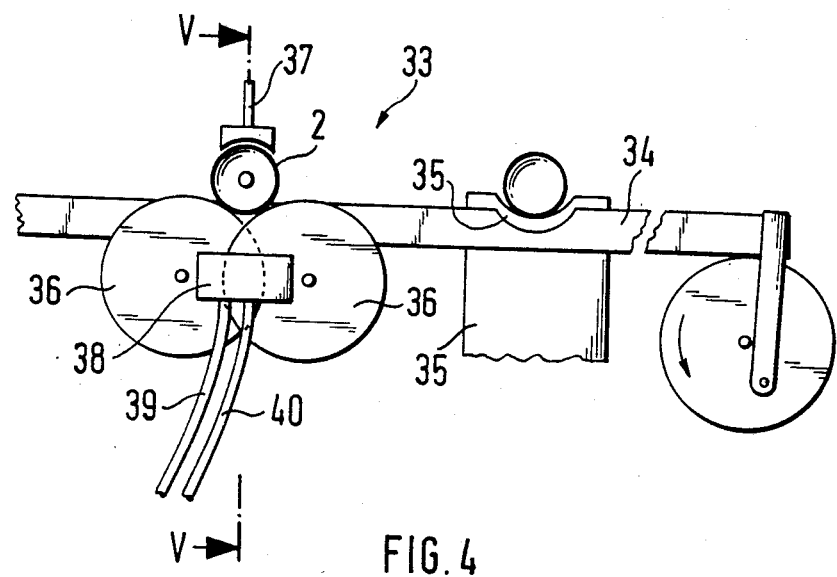
FIG. 4 a working station essential for the invention with respect to an apparatus for the manufacture of thermoareometers in a diagrammatic side view.

The thermoareometer 1 according to the invention is shown in FIG. 1, its upper part being cut off. Thermoareometer 1 has a body or envelope tube 2 with a generally tapered end 3, which is constructed as a receptacle 4 for a bulb 8. The lower end of receptacle 4 is cylindrical and has an accurately defined inner contour. The thermoareometer 1 also has an inner thermometer 6 in the literal sense of the word with a thermometer capillary 7 or capillary part and with a cylindrical vessel 8 for the thermometric liquid at the lower end. the external diameter of bulb 8 accurately corresponds to the internal diameter of receptacle 4 down to the bottom rounded part 5. The thermometer capillary 6 with its bulb 8 is fitted into receptacle 4. Above bulb 8, envelope tube 2 is filled with good heat conducting material 11 in the form of finely divided copper or the like. At the top, the copper 11 is fixed or firmly sealed in by sealing wax 12 or similar materials (optionally high temperature-resistant ceramic materials), so that it cannot slip or slide on turning or sloping thermometer 1. The capillary 7 projects centrally or axially upwards above the sealing wax.

At its upper end, thermometer capillary 7 is provided with an expansion vessel 4. A flat, planar scale carrier 15 is fixed, e.g. by adhesion to capillary 7 and its plane runs along capillary 7 and perpendicular to the plane of the page.

At the upper end 16, remote from receptacle 4, envelope tube 2 is tapered in the case of a thermoareometer 1 (it can be merely sealed in the case of a thermometer). The areometer stem 17 cantaining an areometer scale 18, is centrally fixed to tapered end 16. At the upper end, stem 17 is closed with a top 19.

The thermometer 1 according to FIG. 1 is manufactured according to the following procedure. The bulb 8 with an accurately defined outer contour is firstly formed at one end 7' of thermometer capillary 7. This is brought about in that the capillary 7 is inserted in a mould 20 (in two parts in the represented embodiment), which is e.g. made from carbon, brass, copper, etc. The mould has an accurately determined, preferably cylindrical cavity. the previously fused end 7' of capillary 7 is heated and gas is blow into its end remote from end 7'. This leads to the expansion of the end inserted in mould 20 and it engages against the inner walls of the mould, so that the outer contour of the bulb being formed exactly assumes the contour of the cavity of mould 20. For the production of particularly large bulbs, additional liquid gas can be added. Following cooling, the mould is opened and the thermometer capillary 7 provided with the bulb 8 is removed. This process can be performed completely automatically with an automatic glass blowing machine. An extremely accurate expansion vessel is obtained, whose shape achieves an accuracy of up to 1/100 in the vicinity of the bulb.

After providing the thermometer capillary 7 with the lower bulb 8, the capillary 7 is filled with expansion fluid and after filling, it is placed together with a plurality of identically constructed capillaries in a thermostat, e.g. a liquid bath. This is followed by heating to the temperature well below the evaporation temperature of the expansion fluid. As a result, the expansion fluid in the liquid state is expelled to such an extent that the same fluid quantity remains in all the thermometer capillaries. The fluid which has run out can then be wiped or rinsed off. This is followed by the main adjustment by marking, e.g. two thermometer liquid levels at two different temperatures, one of which is generally the freezing point. Following adjustment, the thermometer expansion vessel 14 is sealed, accompanied by the simultaneous formation of the expansion enlargement, followed by the fixing, e.g. bysticking on, to capillary 7 of the scale carrier 15 carrying the thermometer scale.

For producing the envelope tube 2, a glass tube section 2' is closed at its lower end 21 in per se known manner. In the represented embodiment of FIG. 3, the end is merely welded together. This could be replaced by a preshaping in that, accompanied by heating, the end of tube section 2' is forced into a suitable mould, corresponding to mould 20. Following the closing of end 21 of tube section 2', accompanied by a heat supply to the lower end region 21 of tube section 2', a mandrel 22 is preferably automatically inserted in the latter and the lower region of the mandrel also has an accurately predetermined shape or contour, which in particular corresponds to the thermometer capillary 7 at the bottom end 23 of mandrel 22, which is preferably rounded, if the expansion vessel of the thermometer capillary is constructed as a cylinder. Through the introduction of the mandrel at heated end 21, the latter is pressed into the shape shown in FIG. 1 and receptacle 4 is formed, the inner contour being accurately formed by the outer contour of the mandrel.

Figure 5:
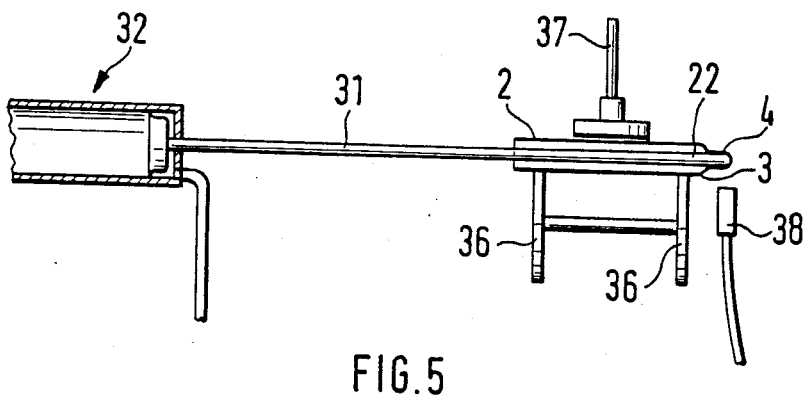
FIG. 5 a section along V—V of FIG. 4.

Mandrel 22 is formed at the front end of a ram 31 of a piston- cylinder unit 32, which is in turn part of an apparatus for manufacturing thermometers and thermoareometers 1, whereby FIGS. 4 and 5 diagrammatically show its essential working station 33 for forming the bottom rounded part 5 of receptacle 4 of envelope tube 2.

Tube sections 2', which are already closed at one end, are discontinuously supplied by means of a gripper 34 moved in connecting rod-like manner to working station 33 and between the conveying processes they are placed in bracket-like bridges 35 after which, during the next conveying cycle, they are taken up again from a gripper recess 35, so that they are conveyed on. In the vicinity of working station 33, the tube sections 2' are placed on disks, which can optionally rotate and also rotate the tube section 2', so that the latter is constructed in axially symmetrical manner during shaping. Tube section 2' is secured by a pressing member 37 in working station 33, so that it cannot be axially displaced. The end 3 of tube section 2' forming receptacle 4 is heated by a burner 38, to which gas is supplied by a line 39 and to which oxygen is supplied by a line 40. When member 32 is secured, mandrel 22 on ram 31 is forced into tube 2' and extends out the heated base of the one-sided closed tube 2' in area 3 to receptacle 4 for the thermometer bulb so that subsequently the envelope tube 2 has been produced. Ram 31 is then retracted again, envelope tube 2 is conveyed on and the next glass batch of tube 2' supplied is correspondingly shaped.

Following production, the mandrel is withdrawn and then the thermometer capillary 7 can be fitted into the thus obtained envelope tube, the bulb 8 being placed in receptacle 4 and its outer wall sealingly engages on the inner wall of receptacle 4, whilst avoiding air pockets.

As the thermometer capillary 7 has already been completely manufactured and provided with scale carriers before insertion into envelope tube 2, there is no need for the complicated prior art step of subsequently providing it with a scale carrier.

After inserting the thermometer capillary into envelope 2, heat conducting material 11, such as flat copper particles, are introduced into it up the area immediately above the bulb 8. The heat conducting material 11 is provided there with a fixture 12, e.g. is sealed in with sealing wax or temperature-resistant ceramic materials.

In the case of a thermoareometer, a constriction is made at the upper end of the envelope tube 2 forming the areometer body and on this is placed the areometer stem. Adjustment of the areometer takes place in per se known manner, including the sealing in of the ballast by sealing wax or the like, as well as the insertion of the scale carrier provided with the areometer scale into the areometer stem and finally the closure thereof, by the stem top in usual manner.

The features of the invention disclosed in the above description, the drawings and claims can be essential for the realisation of the various embodiments of the invention, either singly or in random appropriate combinations.

What is claimed is:

1. The method of manufacturing a glass thermometer including an inner capillary tube vessel and an outer envelope receptacle vessel and including the following steps, forming a lower end of the heat softened receptacle envelope vessel by means of a mandrel having a predetermined cylindrical shape to provide an inner contour of predetermined shape, and forming the lower end of said capillary probe vessel in a mold having a cylindrical inner surface such that a bulb end is formed to predetermined shape for closely fitting into the cylindrical receptacle contour, said forming in said mold being accomplished at least in part by blowing as the capillary tube is so provided in the mold, and fitting the complementary shaped capillary tube and envelope receptacle together so that the lower ends fit tightly together through a major portion of their surfaces to form a thermometer bulb, said envelope tube being initially closed and then, accompanied by heating to softness, the mandrel being inserted in the closed envelope tube end a distance sufficient to provide an accurately determinable bulb shape.

2. A method according to claim 1, wherein the glass thickness of the thermometer receptacle is determined by the mandrel insertion depth.

3. A method according to one of the claims 1 or 2, wherein the lower end of the envelope tube for forming the protuberance adapted to the bulb is merely heated to such an extent that the inserted mandrel can force out the protuberance.

4. A method according to claim 1 or 2, where in the thermometer receptacle is formed in that the lower end of the envelope tube is initially closed and then, accompanied by heating the mandrel is inserted in the closed envelope tube end, and accurately determinable protuberance being heated and liquefied to such an extent that the molten glass still does not drop freely down.

5. A method according to one of the claims 1 or 2, wherein initially the thermometer is adjusted and provided with a scale, before being inserted in the envelope tube.

6. A method according to one of the claims 1 or 2, wherein, prior to adjustment, the thermometer capillary provided with the bulb is introduced into a thermostat, to make excessive thermometric liquid flow out.

7. A method according to claim 6, wherein the space in the envelope tube in the immediate vicinity of the bulb is filled with good heat conducting material, such as copper or silver particles and the material is then fixed.

8. A method according to claim 5, wherein, prior to adjustment, the thermometer capillary provided with the bulb is introduced into a thermostat, to make excessive thermometric liquid flow out.

9. A method according to claim 8, wherein the space in the envelope tube in the immediate vicinity of the bulb is filled with good heat conducting material, such as copper or silver particles and the material is then fixed.

10. A method according to claim 5, wherein the space in the envelope tube in the immediate vicinity of the bulb is filled with good conducting material, such as copper or silver particles and the material is then fixed.

11. A method according to claim 4, wherein initially the thermometer is adjusted an provided with a scale, before being inserted in the envelope tube.

12. A method according to claim 11, wherein, prior to adjustment, the thermometer capillary provided with the bulb is introduced into a thermostat, to make excessive thermometric liquid flow out.

13. A method according to claim 12, wherein the space in the envelope tube in the immediate vicinity of the bulb is filled with good heat conducting material, such as copper or silver particles and the material is then fixed.

14. A method according to claim 11, wherein the space in the envelope tube in the immediate vicinity of the bulb is filled with good heat conducting material, such as copper or silver particles and the material is then fixed.

15. A method according to claim 3, wherein initially the thermometer is adjusted and provided with a scale, before being inserted in the envelope tube.

16. A method according to claim 4, wherein prior to adjustment, the thermometer capillary provided with the bulb is introduced into a thermostat, to make excessive thermometric liquid flow out.

17. A method according to claim 16, wherein the space in the envelope tube in the immediate vicinity of the bulb is filled with good heat conducting material, such as copper or silver particles and the material is then fixed.

18. A method according to claim 4, wherein the space in the envelope tube in the immediate vicinity of the bulb is filled with good heat conducting mateial, such as copper or silver particles and the material is then fixed.

19. A method according to claim 15, wherein, prior to adjustment, the thermometer capillary provided with the bulb is introduced into a thermostat, to make excessive thermometric liquid flow out.

20. A method according to claim 19, wherein the space in the envelope tube in the immediate vicinity of the bulb is filled with good heat conducting material, such as copper or silver particles and the material is then fixed.

21. A method according to claim 15, wherein the space in the envelope tube in the immediate vicinity of the bulb is filled with good heat conducting material, such as copper or silver particles and the material is then fixed.

22. A method accoding to claim 3, wherein prior to adjustment, the thermometer capillary provided with the bulb is introduced into a thermostat, to make excessive thermometric liquid flow out.

23. A method according to claim 22, wherein the space in the envelope tube in the immediate vicinity of the bulb is filled with good heat conducting material, such as copper or silver particles and the material is then fixed.

24. A method according to claim 3, wherein the space in the envelope tube in the immediate vicinity of the bulb is filled with good heat conducting material, such as copper or silver particles and the material is then fixed.

25. A method according to claims 1 or 2 wherein the space in the envelope tube in the immediate vicinity of the bulb is filled with good heat conducting material, such as copper or silver particles and the material is then fixed.

26. A method for making thermoaerometers comprising the following steps
(a) providing a capillary tube of glass,
(b) blowing the glass tube so as to form a bulb at one end while simultaneously,
(c) placing the bulb in a mold so that the bulb is formed to a shape with a spherical end portion and a cylindrical portion adjacent to the spherical end portion,
(d) filling the tube with an expansion liquid,
(e) heating the fluid filled tube so that the fluid rises to a predetermined height, and then wiping away any excess fluid,
(f) calibrating the tube by reference to a known temperature,
(g) sealing the tube at its opposite or upper end,
(h) affixing a scale to the tube,
(i) providing an outer envelope tube also of glass,
(k) closing the lower end of the envelope by tapering said lower end,
(l) heating to soften said lower end while it is so closed,
(m) inserting a mandrel into the heat softened envelope which mandrel has an end portion corresponding to the spherical end portion and adjacent cylindrical end portion of the bulb on the thermometer so that the envelope defines a pocket to snugly receive the thermometer bulb,
(n) placing the bulb portion into the pocket formed by the mandrel,
(o) closing the upright end of the envelope to provide a thermometer with attached scale inside a protective outer envelope, which thermometer has a probe end defined by the closely fitted lower end portions of the thermometer and envelope for rapidly assuming the temperature of its surroundings.

27. In a method for making thermometers wherein a glass capillary tube is formed with a bulbous lower end portion, and wherein the capillary tube is provided in an outer envelope also of glass, the improvement comprising forming the bulb in a press and blow process within a forming mold, and forming the corresponding end of the outer glass envelope by softening the glass and expanding the end portion as a result of forcing a mandrel into the end of the envelope, and providing these end portions of the glass capillary tube and envelope in intimate contact with one another in the area where the glass tube and glass envelope have been so formed by the mold and mandrel respectively.

28. A thermometer produced by the method of claim 27.

* * * * *